United States Patent
Salazar (10) Patent No.: US 7,490,787 B1
(45) Date of Patent: Feb. 17, 2009

(54) LAWN DEBRIS BAGGING SYSTEM

(76) Inventor: Arthur J. Salazar, 409 Dogwood Ct., Eaton, CO (US) 80615

( * ) Notice: Subject to any disclaimer, the term of this patent is extended or adjusted under 35 U.S.C. 154(b) by 759 days.

(21) Appl. No.: 11/103,046

(22) Filed: Apr. 11, 2005

Related U.S. Application Data (60) Provisional application No. 60/561,125, filed on Apr. 9, 2004.

(51) Int. Cl.
*B02C 11/08* (2006.01)
(52) U.S. Cl. .................................. 241/62; 241/285.2
(58) Field of Classification Search .................. 241/55, 241/62, 100, 285.2, 285.3
See application file for complete search history.

(56) References Cited

U.S. PATENT DOCUMENTS

| | | |
|---|---|---|
| 3,744,081 A | 7/1973 | Miller |
| 3,850,364 A | 11/1974 | Robbins |
| 3,860,181 A | 1/1975 | Enters et al. |
| 3,861,603 A | 1/1975 | Lautzenheiser et al. |
| 3,907,214 A | 9/1975 | Dunkel |
| 3,908,914 A | 9/1975 | Cushman |
| 3,929,236 A | 12/1975 | Koturov |
| 3,934,999 A | 1/1976 | Meier |
| 3,989,182 A | 11/1976 | Stearley |
| 3,995,414 A | 12/1976 | Kerr et al. |
| 4,074,869 A | 2/1978 | Johnson |
| 4,117,983 A | 10/1978 | Browning |
| 4,325,163 A | 4/1982 | Mattson et al. |
| 4,505,095 A | 3/1985 | Short, Sr. |
| 4,566,257 A | 1/1986 | Akrabawi |
| D299,349 S | 1/1989 | Cunning |
| 4,971,274 A | 11/1990 | Mitchell |
| 5,011,103 A | 4/1991 | Hayes et al. |
| 5,020,309 A | 6/1991 | Hopkins |
| 5,031,277 A * | 7/1991 | Coker ..................... 15/257.3 |
| 5,102,056 A | 4/1992 | Ober |
| 5,213,141 A | 5/1993 | Dorman |
| 5,243,809 A | 9/1993 | Redding |
| 5,381,970 A | 1/1995 | Bold et al. |
| 5,393,022 A | 2/1995 | Palumbo |
| 5,406,777 A | 4/1995 | Porto |
| 5,474,241 A * | 12/1995 | Kennedy ..................... 241/81 |
| 5,692,262 A | 12/1997 | Haupt et al. |
| 5,842,651 A | 12/1998 | Smothers |
| 5,979,842 A | 11/1999 | Fan |
| 6,135,637 A | 10/2000 | Kim |
| 6,155,522 A | 12/2000 | Anderson |
| 6,296,212 B1 | 10/2001 | Monahan |
| 2003/0173471 A1 | 9/2003 | Weathers et al. |

* cited by examiner

*Primary Examiner*—Faye Francis
(74) *Attorney, Agent, or Firm*—Margaret Polson; Patent Law Offices of Rick Martin, PC (57) ABSTRACT

A lawn debris bagging system is disclosed. A temporary chute is provided to direct lawn debris or similar material toward a vented bag. The frame of the chute has an opening with a holding mechanism to hold a vented bag open and substantially on it's side, to allow the lawn debris to be blown into the bag. The vents on the bag allow the use to blow the debris into the bag without the debris being blown back out of bag by the force of the air column. In an alternate embodiment a mulcher is mounted on the opening such that the debris are blown into the mulcher and then flow into the bag from the mulcher.

4 Claims, 7 Drawing Sheets

LAWN DEBRIS BAGGING SYSTEM

CROSS REFERENCE APPLICATIONS

This application is a non-provisional application claiming the benefits of provisional application No. 60/561,125 filed Apr. 9, 2004.

FIELD OF INVENTION

The present invention relates to a device for bagging leaves, grass clippings and other lawn debris using a leaf blower or similar device. The invention further relates to a device to shred (mulch) and bag lawn debris in a single operation.

BACKGROUND OF THE INVENTION

A number of devices are known in the art for bagging and/or shredding lawn debris. Some of the patents are listed below.

U.S. Pat. No. 3,744,081 (1973) to Miller discloses a plastic leaf collection bag which is temporarily secured to the ground by its extended vertical opening frame to allow for sweeping leaves into the bag.

U.S. Pat. No. 3,989,182 (1976) to Stearley discloses a vented bag which comprises a front wall, a back wall, and opposite end walls forming an enclosed container. Venting allows air to escape from the interior outwardly through the vent perforations.

U.S. Pat. No. 3,995,414 (1976) to Kerr et al. discloses a removable plastic trash bag which is hung from a frame attached to a lawn mower. The bag is vented to allow the air to escape.

U.S. Pat. No. 4,505,095 (1985) to Short, Sr. discloses a hoop adapter assembly to be attached to the exit opening of the discharge duct of a lawnmower. It will fit a disposable trash bag for picking up leaves.

U.S. Pat. No. 4,566,257 (1986) to Akrabawi discloses a plate like apparatus with an opening sized to fit the discharge chute of a mower. It propels clippings from the cutting area through a discharge chute and allows the clippings in a horizontally disposable trash bag. The plate has a vent hole to allow the air to escape.

U.S. Pat. No. 4,971,274 (1990) to Mitchell discloses a combination holder for maintaining the mouth of a plastic garbage or leaf bag in an open position for later disposal.

U.S. Pat. No. 5,011,103 (1991) to Hayes et al. discloses a collapsible frame which supports a leaf bag in a position that a portion of the bag rest horizontally on the ground and the remainder of the bag is attached to the frame to present an arch shaped opening for the collection of debris.

U.S. Pat. No. 5,243,809 (1993) to Redding discloses a disposable bag apparatus that acts as an accessory to a lawn mower. As the bag fills with lawn debris air is expelled from the vents in the bag.

U.S. Pat. No. 5,393,022 (1993) to Palumbo discloses a portable, multi-compartment garden debris bag holder. It has a plurality of adjacent members interconnecting and is defined by a central opening which allows for debris collection.

U.S. Pat. No. 5,979,842 (1999) to Fan discloses a wide opening bagger apparatus which has a platform to receive and lead the objects such as leaves into the bag.

U.S. Pat. No. 6,155,522 (2000) to Anderson discloses a yard debris collecting system which uses a chute for putting debris into a bag. It includes a pivotable frame, a chute couplable to the frame, a collection bag couplable to the frame such that the chute extends into and opens into the open bag.

U.S. Pat. No. 6,296,212 (2001) to Monahan discloses a support device for holding a lawn debris bag open. The device holds the length of a bag open on one side which allows for raking and filling the leaf bag.

U.S. Pat. No. 2003/0173471 (2003) to Weathers et al. discloses a chute apparatus for collecting leaves. It has an upper chute portion with on open front portion that is wider then the rear end of the chute. There are two smaller matching chute sides attached at either side of the back chute portion.

Many of the above listed devices still require the user to rake the debris into a pile before bagging. Many of the known mulchers require the user to pick up the debris and drop them into the mulcher. Even if the user uses a prior art leaf blower to move the debris, it is often difficult to use the leaf blower to get the debris into a nice pile for bagging and/or shredding. Blowing the debris into a bag is often difficult, because the air column will blow the debris back out of the bag, even if the bag is held open on its side. None of the prior art mulchers are designed to be used with a leaf blower. The present invention solves these problems by providing a chute to direct to debris toward a vented bag, allowing the air column to escape the bag. In an alternate embodiment, a lawn debris mulcher is placed at the base of chute before the vented bag to shred (mulch) the debris and bag them in one operation.

SUMMARY OF THE INVENTION

The primary aspect of the present invention is to provide a lawn debris bagging system that can be used with a leaf blower.

Another aspect of the present invention is to provide a mulcher that can be used in conjunction with a leaf blower.

Other aspects of this invention will appear from the following description and appended claims, reference being made to the accompanying drawings forming a part of this specification wherein like reference characters designate corresponding parts in the several views.

A temporary chute is provided to direct the debris toward a vented bag. The frame of the chute has an opening with a holding mechanism to hold a vented bag open and substantially on it's side, to allow the lawn debris to be blown into the bag. The vents on the bag allow the user to blow the debris into the bag without the debris being blown back out of bag by the force of the air column. In an alternate embodiment a mulcher is mounted on the opening such that the debris are blown into the mulcher and then flow into the bag from the mulcher.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF INVENTION

Figure 1:
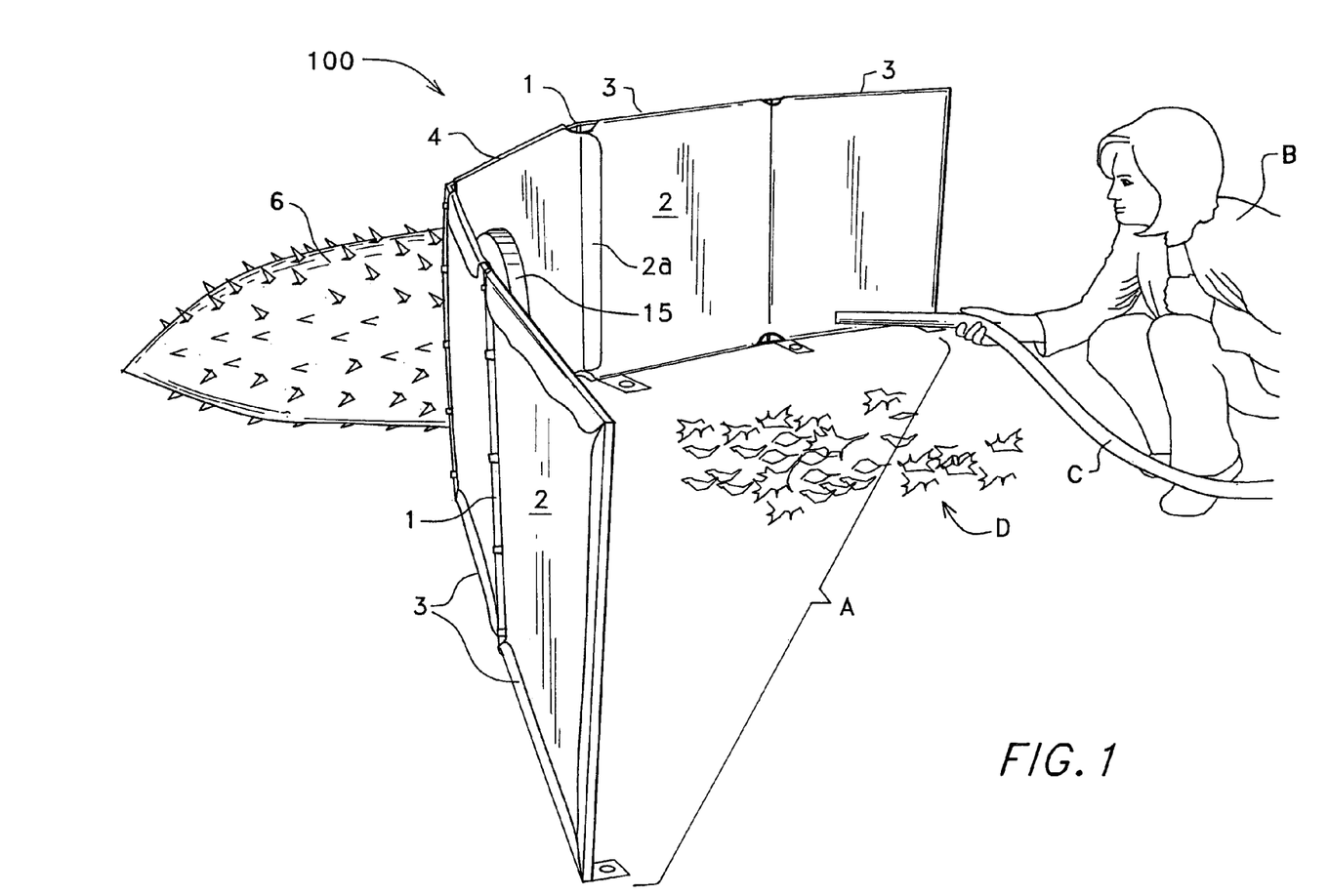
FIG. 1 is a perspective view of the present invention in use.

Referring first of FIG. 1, the lawn debris bagging system 100 has a frame 1 with a cover 2. The frame 1 can be made of any sufficiently rigid material, preferably a lightweight material. Aluminum, PVC, fiberglass and other similar materials can all be used. The choice of frame material will depend on cost vs. weight considerations. It is well known in the art to select a sufficiently rigid, lightweight material to ensure the appropriate cost vs. weight tradeoff in any given application. Other considerations for frame choice might include ease of manufacture, recyclebility, long term wear and other considerations. The cover 2 can either be permanently attached to the frame 1 or can be made removable. The cover 2 can be made of fabric, plastic, heavy paper or similar material. The choice of cover material will depend on the planned use. It is believed that the most common cover material will be fabric, preferably an outdoor use fabric. The fabric can be sewn, allowing for easy manufacturing.

Figures 2, 4, 5:
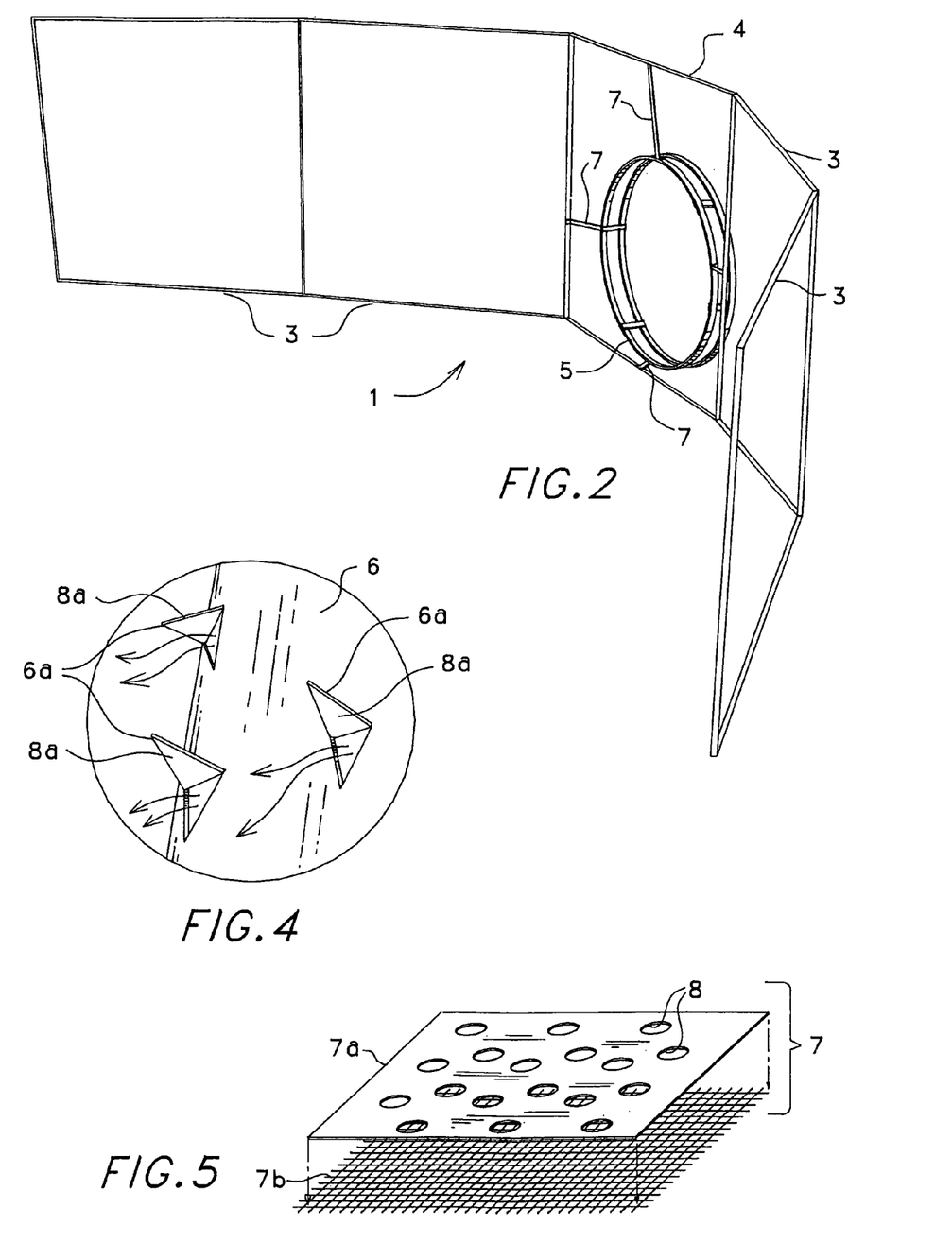
FIG. 2 is a perspective view of the rigid frame of the present invention without the covering.
FIG. 4 is a detail of FIG. 3 showing the airflow out of the vents in the bag.
FIG. 5 is an exploded view of the layers of one embodiment of the vented bag.
Figure 8:
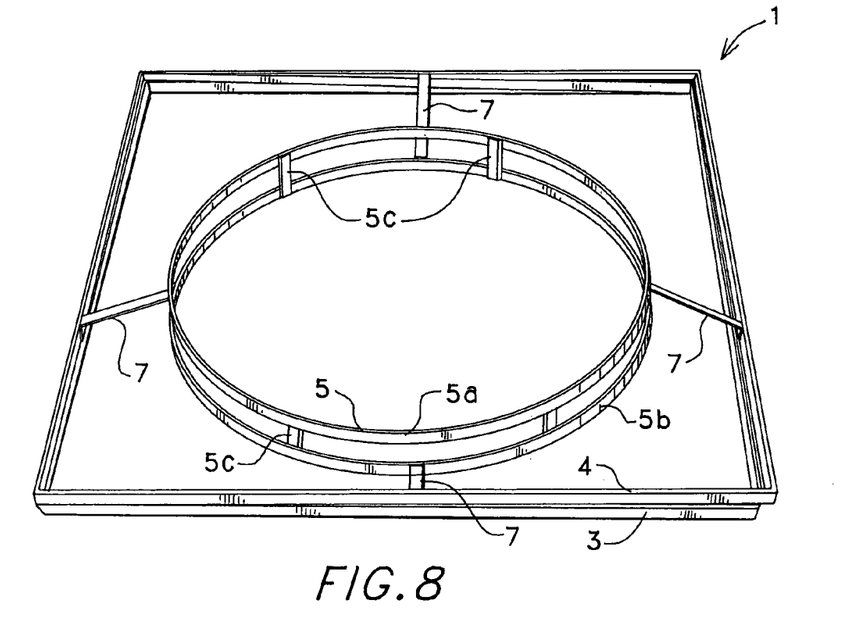
FIG. 8 is a perspective view of the frame with the cover removed and the frame folded for storage.

As shown in FIGS. 1 and 2, the frame 1 has directing panels 3 and a bag holding panel 4. The panels are pivotally connected to allow the user to choose the size of opening A. The pivoting also allows the frame 1 to be folded for easy storage and transport, as shown in FIG. 8. The depicted embodiment shows the bag holding panel 4 in the center of the frame 1. It is possible to have the panels be removeably connected so that the panels can be arranged in any desired order, depending on the desired use.

Figure 12:
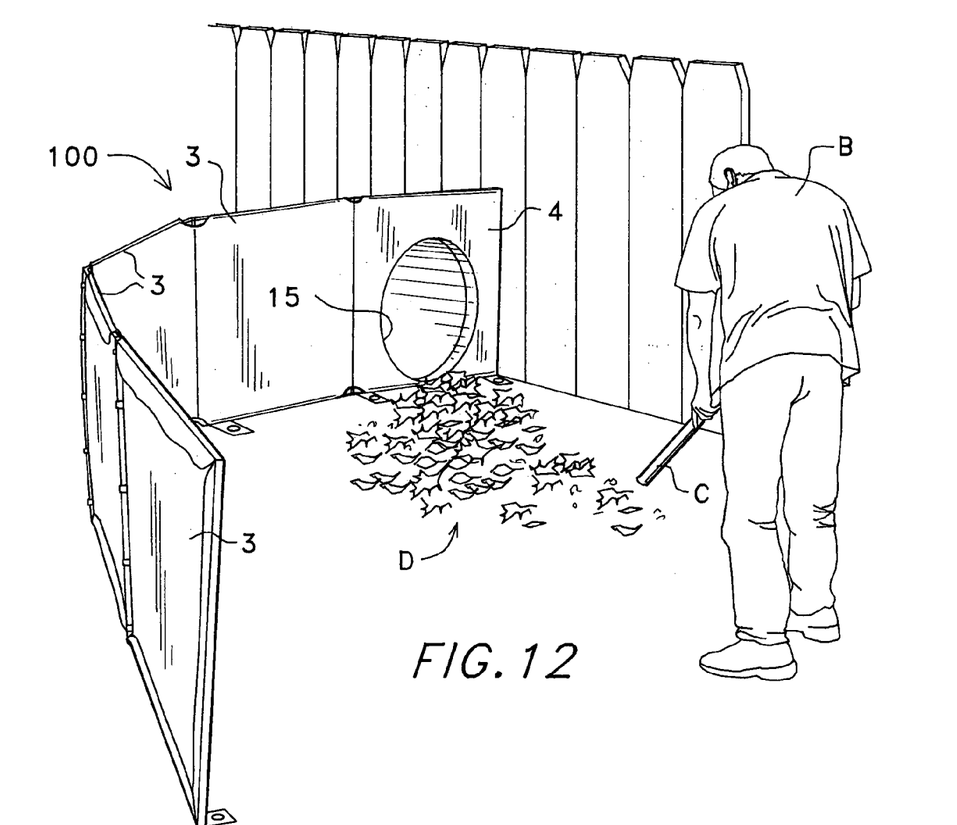
FIG. 12 is a perspective view of the present invention in use.

For example, if the debris to be bag are against a building or fence, it may be desirable to have the bag holding panel 4 on one end of frame 1, so that it can be place against the building, thereby using the building as part of the chute, as shown in FIG. 12. The user could also set up the system with only one directing panel 3 on each side of bag holding panel 4 for use in small spaces. This greater flexibility in the set up of the lawn debris bagging system 1 increases the usefulness of the system.

Figure 3:
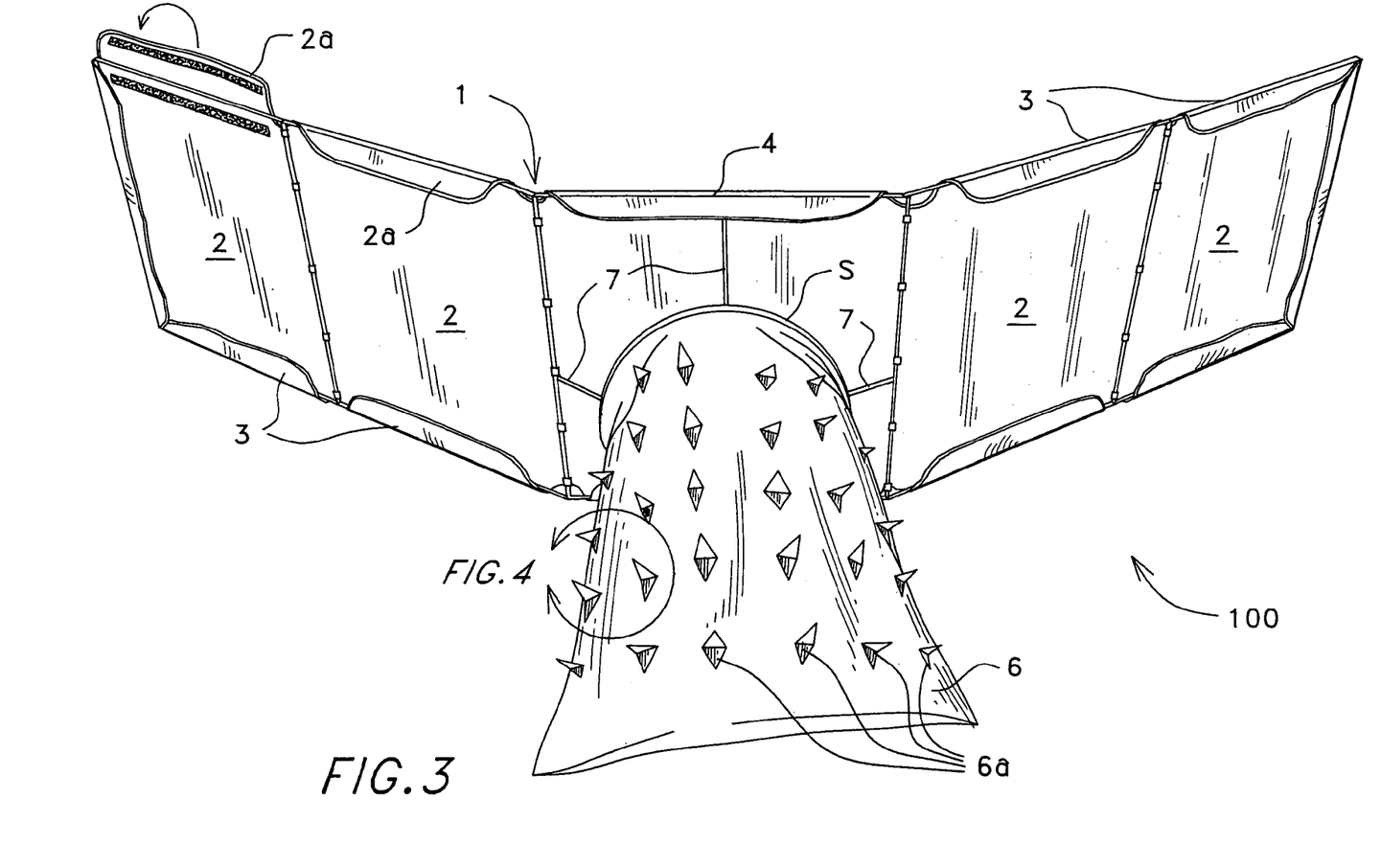
FIG. 3 is a back perspective view of chute of FIG. 1 with the vents on the bag open.

The cover 2 can be removable, as shown in FIG. 3. In the depicted embodiment hook and loop strips attach a flap 2a to the body of the cover 2, wrapping over the frame 1. Snaps, hooks and eyes, buttons, zippers, ties, or other known attachment mechanisms could also be used. If a disposable paper cover 2 is to be used, then adhesive strips could also be use. If a plastic cover 2 is used, heat sealing could also be used to form the seams. The cover 2 can be made as a single piece, or can be made to cover each panel individually. The latter is required if the panels are removably attached to each other and can be re-arranged. If the panels are permanently attached to each other, then the cover is preferably sewn as one piece. If there is a cover 2 for each panel, then a flap 2a can be provided on the sides, as shown in FIG. 1, to ensure that debris do not blow between the panels. In addition, is would be possible to mold each panel out of plastic or other suitable material as a single unit.

Figure 7:
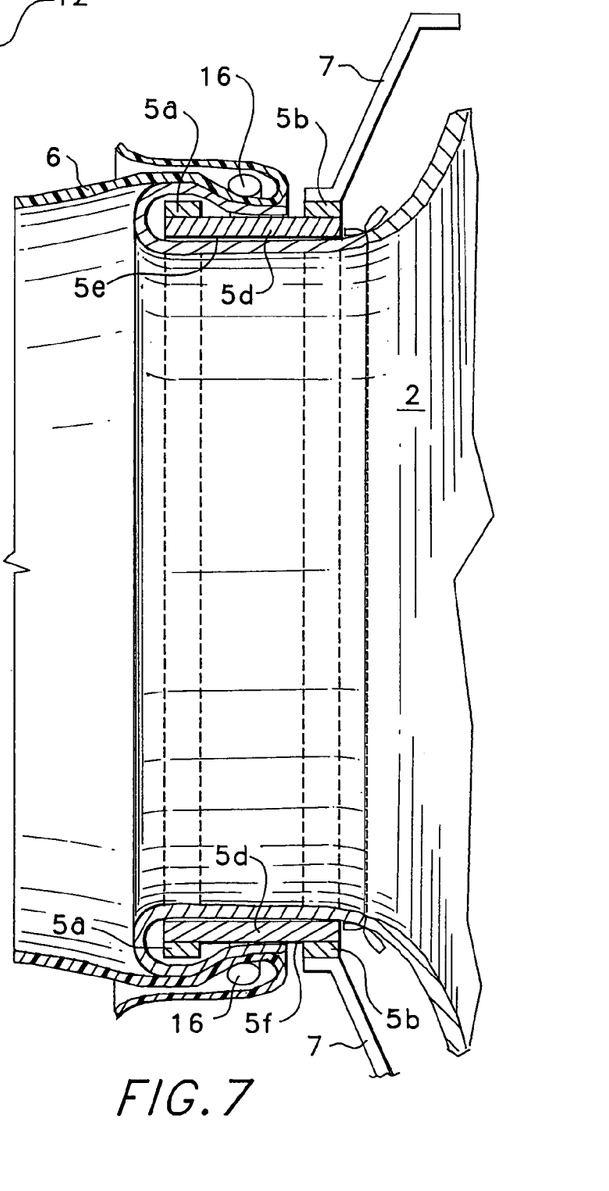
FIG. 7 is a detailed view of an attachment mechanism for the leaf bag.
Figure 11:
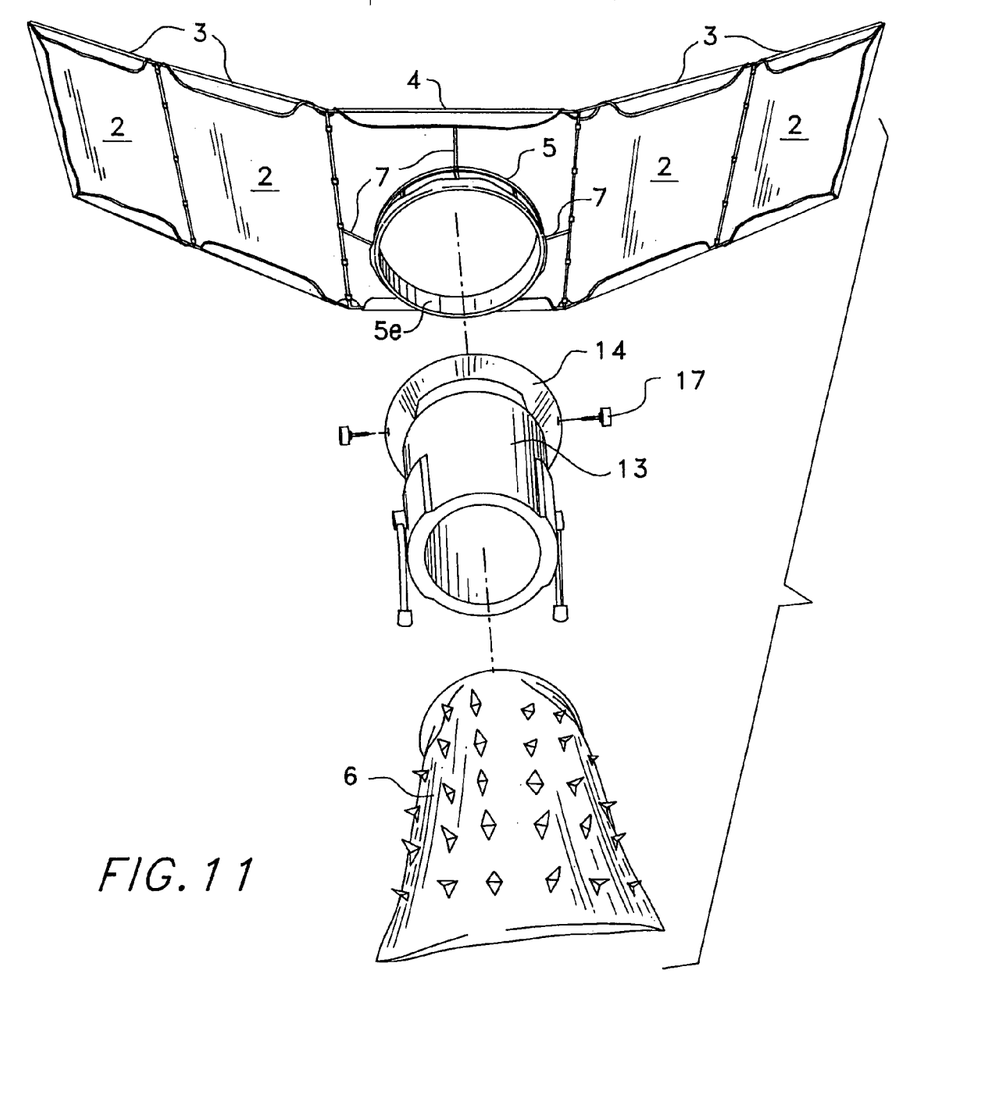
FIG. 11 is an exploded view of the embodiment of FIG. 9.

As best seen if FIGS. 2 and 3, the bag holding panel 4 has an attachment ring 5 to hold the bag 6. The attachment ring 5 is attached to the frame 1 with struts 7. The attachment ring 5 can be centered in the panel 4, or placed off-center as shown, putting the bag opening closer to the ground in use. In the depicted embodiment the ring is 5/8 of an inch off the ground. The attachment ring 5 can work in a number of different ways, depending on the exact usages. One embodiment, shown in FIGS. 2 and 8, has two exterior rings 5a and 5b which are connected by braces 5c. Another embodiment, shown in FIG. 7, the two exterior rings 5a and 5b are connected by a solid plate 5d. In either case, the cover 2 extends through the inner surface 5e of attachment ring 5 and around to the top surface 5f, as shown in FIG. 11 and in detail in FIG. 7. The bag 6 is slide over the top surface and attached with a metal ring clip or elastic band 16 to top surface 5f as shown in FIG. 7. There are numerous possible attachment mechanisms for the bag 6 to attachment ring 5.

Bag 6 has vents 6a to allow the air to escape the bag 6, as shown by the arrows in FIG. 4. FIG. 5 is an exploded view of one possible vented bag. The bag has two layers 7. The outer layer 7a has holes 8. The inner layer 7b is a mesh to retain all the small debris in the bag 6 while allowing the air to escape as shown in FIG. 4. The outer layer 7a is a stiff plastic or similar material, and the mesh of the inner layer 7b has approximately 1/4 inch square holes in the depicted embodiment. The hole 8 may have flaps 8a as shown in FIG. 4 or not, as shown in FIG. 5.

Figure 6:
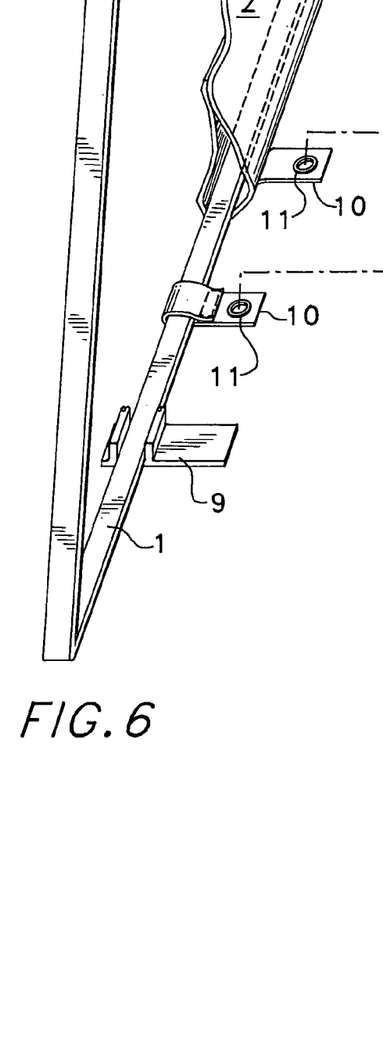
FIG. 6 is a perspective view of the tie down stakes to hold the chute in place during use.

The frame 1 generally needs to be stabilized with either feet or by staking the frame 1 to the ground. As shown in FIG. 6, a variety of different stabilizing tabs can be utilized. A clip on tab 9 can be used to provide feet on hard surfaces where it is not possible to stake the frame 1 to the ground. The frame 1 can be staked to the ground using attachment tabs 10, which have holes 11. The holes 11 can be formed by grommets, or similar re-enforcements. The attachment tabs 10 can be attached to the frame 1 or the cover 2. Numerous other possible configurations of attachment tabs 10 are also possible depending on the materials used for the frame 1 and the cover 2. Stakes 12 are placed through the hole 11 to stake the frame to the ground in a known manner.

Figure 9:
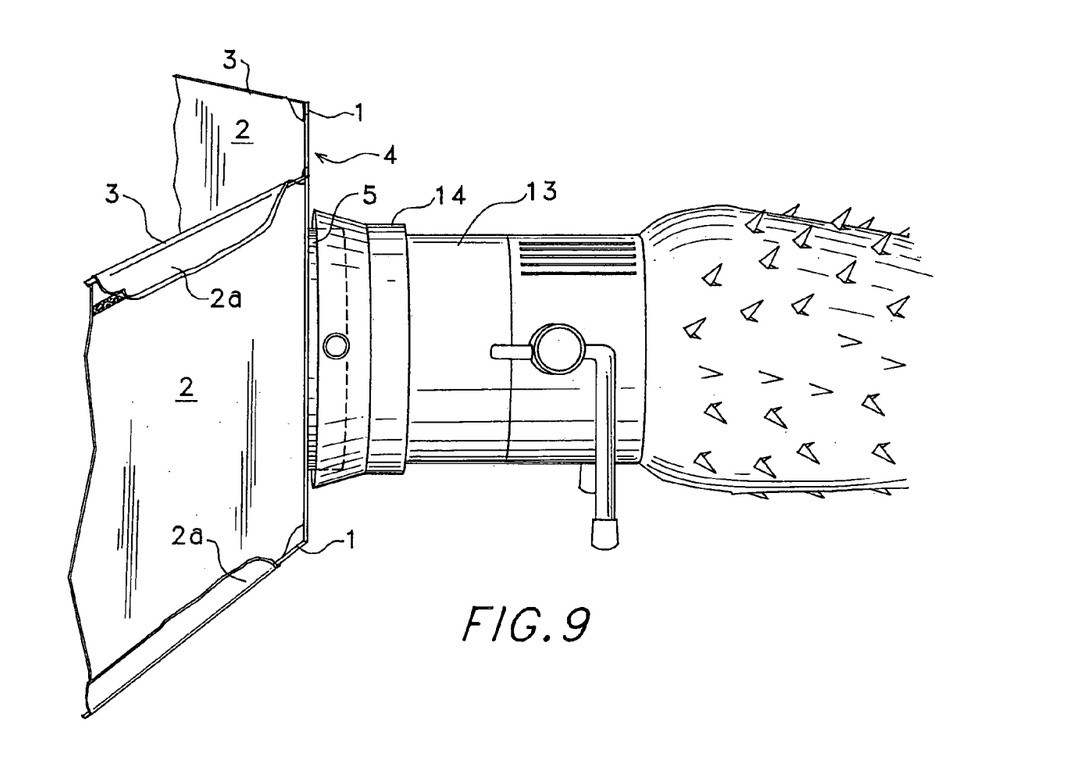
FIG. 9 is a side view of the chute with a mulcher mounted on the frame and the bag attached to the back end of the mulcher.
Figure 10:
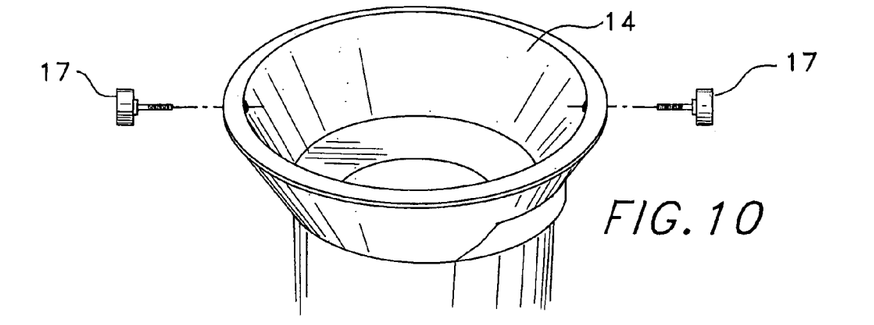
FIG. 10 is a perspective view of the attachment collar for the mulcher.

The lawn debris bagging system 1 can also have a mulcher 13 mounted to the attachment ring 5 as shown in FIGS. 9 and 11. The mulcher 13 has an attachment collar 14, shown in detail in FIG. 10, to attach to the attachment ring 5. The bag 5 is then attached to the back end of the mulcher 13. This allows the user to collect, shred, and bag lawn debris in one step, using a leaf blower, without having to handle the lawn debris.

The attachment collar 14 can be attached to the attachment ring 5 with screws 17 or other similar devices. The mulcher can be a off the shelf mulcher or one custom made for use with the lawn debris bagging system 100.

In use, the user B would set up the lawn debris bagging system 100 at the desired location and then use a leaf blower C or similar device to move the leaves and other lawn debris D toward the opening 15 in panel 4 as shown in FIGS. 1 and 12. If desired, the user B could use a rake to move the debris, but this is believed to be less efficient. The debris D are blown through opening 15 and either into bag 6 or through mulcher 13 into bag 6, depending on the setup of the system 1.

Although the present invention has been described with reference to depicted embodiments, numerous modifications and variations can be made and still the result will come within the scope of the invention. No limitation with respect to the specific embodiments disclosed herein is intended or should be inferred.

I claim:

1. A lawn debris bagging system comprising:
   a plurality of guide panels, each guide panel having a frame and a cover;
   a bag holding panel having a frame a cover and an attachment location form on the frame;
   a mulcher removably attached to the attachment location;
   a bag attached to the mulcher;
   the panels being attached together along opposing sides such that the panels form a line of panels; and
   when set up the panels form a chute to allow lawn debris to be raked or blown through the mulcher and into the bag.

2. The lawn debris bagging system of claim 1 wherein the bag is a vented bag.

3. The lawn debris bagging system of claim 1 further comprising:
   the panels being removablely attached together such that the panels can be arranged in different configurations depending on the desired use.

4. The lawn debris bagging system of claim 1 further comprising attachment points on the frame to allow the frame to be staked into the ground.

* * * * *